(12) United States Patent
Poullain et al.

(10) Patent No.: US 6,313,603 B1
(45) Date of Patent: Nov. 6, 2001

(54) METHOD OF REGULATING A ROTARY MACHINE, AND POWER SUPPLY CIRCUIT FOR SUCH A MACHINE

(75) Inventors: Serge Poullain, Arpajon; Jean-Luc Thomas, Thomery, both of (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 09/547,867

(22) Filed: Apr. 12, 2000

(30) Foreign Application Priority Data

Apr. 13, 1999 (FR) .................................................. 99 04602

(51) Int. Cl.[7] ......................................................... H02P 5/28
(52) U.S. Cl. ......................... 318/809; 318/799; 318/798; 318/800; 318/801; 318/807; 318/805
(58) Field of Search ..................................... 318/809, 799, 318/798, 800, 801, 807, 805

(56) References Cited

U.S. PATENT DOCUMENTS

| | | | |
|---|---|---|---|
| 4,215,304 | * 7/1980 | D'Atre et al. ........................ | 318/758 |
| 4,227,138 | * 10/1980 | Espelage et al. ..................... | 318/802 |
| 4,672,288 | * 6/1987 | Abbondanti .......................... | 318/803 |
| 4,724,373 | 2/1988 | Lipo . | |
| 5,777,452 | 7/1998 | Thomas . | |

FOREIGN PATENT DOCUMENTS 09 224 399 A  8/1997 (JP) .

* cited by examiner

*Primary Examiner*—Karen Masih
(74) *Attorney, Agent, or Firm*—Sughrue, Mion, Zinn, Macpeak & Seas, PLLC (57) ABSTRACT

A method of regulating a rotary machine powered by a voltage inverter receiving, as input a control voltage delivered by a regulator servo-controlling the electromagnetic torque on a reference value, the regulator receiving as inputs the reference value and sat least one sampled signal representative of the torque of the machine, and proceeding at each sampling instant, to predict the torque value at a following sampling instant and to modify the control voltage accordingly. Servo-control of the torque including steps of prior computation of a discrete model of the system comprising the machine and the inverter to establish variation in torque between two sampling instants in the form of a first term that corresponds to free variation of the system in the absence of a control voltage, and a term corresponding to variation of the system under the action of a control signal, and of modifying the control voltage in such a manner as to cause the electromagnetic torque to vary from a value that corresponds to free variation of the torque to the reference value.

8 Claims, 3 Drawing Sheets

METHOD OF REGULATING A ROTARY MACHINE, AND POWER SUPPLY CIRCUIT FOR SUCH A MACHINE

The present invention relates to a method of regulating a rotary machine, in particular an asynchronous rotary machine. The invention also relates to power supply circuit for such a machine.

More precisely, the invention relates to a method of regulation that is capable of servo-controlling the electromagnetic torque of the machine, and incidentally the magnetic flux (rotor or stator flux) thereof, to corresponding reference values.

BACKGROUND OF THE INVENTION

The speed of an asynchronous machine is generally controlled by regulating the electromagnetic torque of the machine.

For this purpose, asynchronous rotary machines are generally provided with a regulator receiving as input a reference value for the electromagnetic torque, together with one or more sampled signals representing the electromagnetic torque of the machine and derived from a measurement of the stator current.

In order to servo-control the electromagnetic torque of the machine on the reference torque value, the regulator proceeds at each sampling instant with a prediction of the value of the torque at the following sampling instant, and it modifies the control voltage accordingly.

One of the main concerns in most industrial applications is to increase the dynamic performance of such regulators, and in particular to increase the dynamic range of the torque.

In order to enable such a system to have a good dynamic range for its torque, it is necessary for the chopper frequency of the inverter to be large compared with the dynamic range that it is desired to obtain, since otherwise compensation is poorly performed and performance suffers. In particular, the efficiency of the inverter and of the motor decrease so the losses to be dumped increase.

One solution to this problem consists in providing the system with low-loss electronic components. However that solution is unacceptable insofar as it contributes to increasing very considerably the cost of the power supply circuit of the machine.

OBJECT AND SUMMARY OF THE INVENTION

The object of the invention is to mitigate the above-mentioned drawbacks.

The invention thus provides a method of regulating a rotary machine powered by a voltage inverter receiving as an input a discrete control voltage delivered by a regulator for the purpose of servo-controlling the electromagnetic torque of the machine on a torque reference value, the regulator receiving as inputs, said reference value and at least one sampled signal representative of the electromagnetic torque of the machine, and proceeding at each sampling instant to predict the torque value at a following sampling instant and to modify accordingly the control voltage, wherein the servo-control of the electromagnetic torque comprises the following steps:

prior computation of a discrete model of the system comprising the machine and the inverter so as to establish the variation of electromagnetic torque between two sampling instants in the form of a first term corresponding to free variation of the system from a state corresponding to the sampling instant and in the absence of a control voltage, and a term corresponding to variation of the system under the action of the control signal; and modification of the control voltage in such a manner as to cause the electromagnetic torque of the machine to vary from a value corresponding to free variation of the torque towards the torque reference value.

Thus, the improvement in dynamic performance is due to using an improved regulator, which is less expensive than providing higher-performance electrical components.

The regulation method of the invention may also include one or more of the following characteristics, taken in isolation or in any technically feasible combination:

during servo-control of the torque on the reference value, the magnetic flux of the machine is servo-controlled on a reference flux value received as input to the regulator, by acting on the control voltage in such a manner as to cause the magnetic flux to vary from a value corresponding to free variation of the magnetic flux to the reference flux value;

the control voltage is modified at each sampling instant in such a manner as to obtain the reference torque value and the reference flux value at the following sampling instant;

the step of modelling the system consists in rendering discrete the following state equations of the system:

$$\dot{X} = [A(\omega)]X + [B]V_{ref},$$

and $$Y = h(X)$$

in which:

X and Y represent respectively the state vector and the output vector of the machine;

$[A(\omega)]$ represents a state matrix of the machine that varies as a function of the speed $\omega$ of the machine;

[B] represents an input matrix of the system;

h represents an output function of the system; and $V_{ref}$ represents the control voltage; and in generating characteristics $\Delta C$ and $\Delta \phi$ representative of the torque variation and the flux variation to be obtained between firstly free variation during the sampling period and secondly the following sampling instant, on the basis of the discrete model of the system as defined by the following equations;

$$\Delta C = \left( \vec{\Psi}^o_{k+1} \wedge \vec{V}_{ref} \right) - (ad + bc) \| \vec{V}_{ref} \|^2$$

and $$\Delta \phi = 2b \left( \vec{\phi}^o_{k+1}, \vec{V}_{ref} \right) - 2d \left( \vec{\phi}^o_{k+1} \wedge \vec{V}_{ref} \right) + (b^2 + d^2) \| \vec{V}_{ref} \|^2,$$

in which:

$$\vec{\Psi}^o_{k+1} = \begin{bmatrix} a & -c \\ +c & a \end{bmatrix} \vec{\phi}^o_{k+1} - \begin{bmatrix} b & d \\ -d & b \end{bmatrix} \vec{I}^o_{k+1}$$

where a, b, c, and d represent coefficients of the discrete input matrix of the system, $\vec{I}^o_{k+1}$ designates the predicted free variation of the stator current vector during the sampling period, $\vec{\Phi}_{k+1}^{o}$ designates the predicted free variation of the magnetic flux vector of the machine during the sampling period, and $\|\vec{V}_{ref}\|^2$ designates the modulus squared of the control voltage; and the regulator being implemented in such a manner as to determine the value of the control voltage to be applied to the input of the inverter so as to obtain the torque variation $\Delta C$ and the flux variation $\Delta \phi$; and the control voltage applied to the input of the inverter is constituted by the voltage corresponding to minimizing electrical power as selected from reference voltages that satisfy the equations defining said characteristics representative of torque variation and flux variation.

The invention also provides a power supply circuit for a rotary machine comprising a voltage inverter powered by a power supply voltage, a regulator receiving as input an electromagnetic torque reference value and at least one sampled signal representative of the electromagnetic torque of the machine and delivering to the inverter a control voltage suitable for servo-controlling the electromagnetic torque of the machine on the torque reference value, by predicting at each sampling instant the value of the electromagnetic torque at the following sampling instant and by modifying the control voltage accordingly, wherein the regulator includes, stored in memory, a discrete model of the system constituted by the machine and the inverter in the form of a term corresponding to free variation of the system in the absence of control voltage and a term corresponding to variation of the system under the action of the control signal, between two sampling instants, and the circuit further including means for generating a control voltage adapted to cause the electromagnetic torque to vary from a value corresponding to free variation of the torque to the reference torque value.

Advantageously, the regulator receives as input a magnetic flux reference value and a sampled signal representative of the magnetic flux value of the machine, and includes means for generating a control voltage adapted to cause the magnetic flux of the machine to vary from a value corresponding to free variation of the magnetic flux to the reference flux value.

Preferably, the means for generating the control voltage are adapted to generate the control voltage at each sampling instant in such a manner as to obtain said reference torque and flux values at the following sampling instant.

BRIEF DESCRIPTION OF THE DRAWINGS

Other characteristics and advantages will appear on reading the following description given purely by way of example and made with reference to the accompanying drawings, in which.

MORE DETAILED DESCRIPTION

Figure 1:
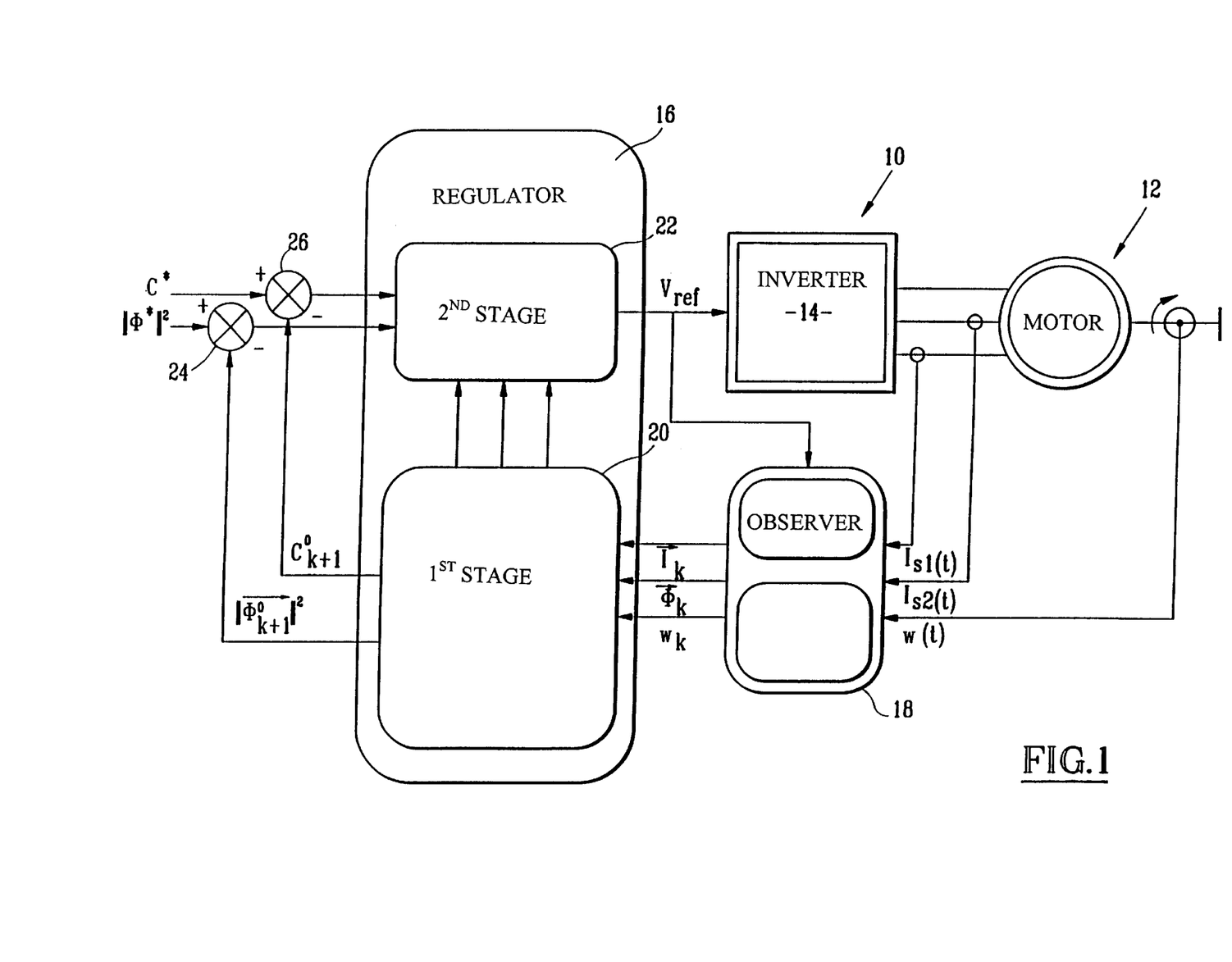
FIG. 1 is a block diagram showing the structure of a power supply circuit for a rotary machine in accordance with the invention.

FIG. 1 shows a power supply circuit 10 for a rotary machine 12.

In this figure, the rotary machine 12 is represented as a three-phase motor, e.g. constituted by the traction motor of an electric rail machine, a robot, or a machine tool.

In conventional manner, the power supply circuit 10 comprises a voltage inverter 14 feeding an alternating voltage to the motor 12, which inverter 14 is connected to a DC source, e.g. at a voltage of about 1500 V to 3000 V, for an application in the rail field.

It will be observed that although the rotary machine 12 can be considered as being a system that is continuous and linear, the inverter 14 constitutes a system that is discrete and non-linear.

The inverter 14 is controlled by a regulator 16. The regulator 16 supplies a control voltage $V_{ref}$ to the inverter 14, which control voltage is generated in such a manner as to servo-control the electromagnetic torque and, incidentally, the magnetic flux of the machine 12 to reference values for electromagnetic torque $C^*$ and for magnetic flux $\|\vec{\Phi}^*\|^2$ corresponding respectively to the electromagnetic torque and magnetic flux values that are to be obtained.

As can be seen in FIG. 1, the regulator 16 also receives as input one or more sampled signals $\vec{I}_k, \vec{\Phi}_k, \omega_k$ corresponding respectively to the stator current vector, to the magnetic flux vector, and to the angular velocity of the rotor of the machine 12, with these signals that represent the electromagnetic torque of the machine being generated by an observer 18 on the basis of continuously measured signals $I_{S1}(t)$, $I_{S2}(t)$ and $\omega(t)$ which correspond respectively to stator phase currents and to a signal measuring the angular velocity of the rotor as delivered by appropriate sensors fitted to the machine 12.

In conventional manner, in order to servo-control the electromagnetic torque and the magnetic flux of the machine 12 on the reference values $C^*$ and $\|\vec{\Phi}^*\|^2$ received as inputs, the regulator 16 proceeds, at each sampling instant and by using software means stored in memory, to predict electromagnetic torque and rotor flux values for the following sampling instant, and it alters the control voltage $V_{ref}$ accordingly so as to obtain the torque and flux values set by the reference values.

It will be observed that the regulator 16 is preferably constituted by a regulator of the "spot-on response" type, i.e. that changes the control voltage $V_{ref}$ in such a manner as to achieve the reference values at the following sampling instant.

For this purpose, the regulator 16 has a first stage 20 having a memory in which there is stored a discrete model of the system constituted by the rotary machine 12 and the inverter 14 for the purpose of computing how the system will vary between two sampling instants, and a second stage 22 for computing the control voltage $V_{ref}$ to be input to the inverter 14 as a function of the variation of the system as predicted by the first stage and as a function of the reference signals C* and $$\|\vec{\Phi}^*\|^2$$

input to the second stage.

In the description below, the method of computing the discrete model of the system constituted by the rotary machine 12 and the inverter 14 is described initially, after which the method of computing the control voltage $V_{ref}$ is described.

As mentioned above, the rotary machine 12 is constituted by a continuous algebraic and differential system that is defined in time, while the voltage inverter 14 is constituted by a system that is non-linear.

The system constituted by the inverter and the machine can be defined by the following state equations:

$$\dot{X}=[A(\omega)]X+[B]V_{ref} \quad (1)$$

$$Y=h(X) \quad (2)$$

In which:

X and $\dot{X}$ and respectively designate the state vector and the derivative of the state vector of the machine, as defined by the measured components of the stator current of the machine and the magnetic flux components of the machine expressed in a frame of reference having two dimensions α and β that is fixed relative to the stator, with X being written as follows, the magnetic state of the machine being represented by the rotor flux:

$$X = \begin{pmatrix} Is\alpha \\ Is\beta \\ \Phi r\alpha \\ \Phi r\beta \end{pmatrix}$$

[A] represents a state matrix of the machine, that varies as a function of the speed ω of the machine and that is written as follows:

$$[A] = \begin{pmatrix} -\gamma & 0 & \alpha\beta & \beta\omega \\ 0 & -\gamma & -\beta\omega & \alpha\beta \\ \alpha L_m & 0 & -\alpha & -\omega \\ 0 & \alpha L_m & \omega & -\alpha \end{pmatrix}$$

[B] represents an input matrix of the system and is written as follows:

$$[B] = \begin{pmatrix} \frac{1}{\sigma Ls} & 0 \\ 0 & \frac{1}{\sigma Ls} \\ 0 & 0 \\ 0 & 0 \end{pmatrix}$$

$V_{ref}$ is expressed in the two-dimensional frame of reference α and that β fixed relative to the stator and that has the following components:

$$V_{ref} = \begin{pmatrix} Vref\alpha \\ Vref\beta \end{pmatrix}$$

and h represents an output function of the system with:

$$\sigma = 1 - \frac{L^2m}{LsLr}, \gamma = \frac{Rsr}{\sigma Ls}, \beta = \frac{Lm}{\sigma LsLr}, \alpha = \frac{Rr}{Lr}$$

and with:

$$Rsr = Rs + Rr\left(\frac{Lm}{Lr}\right)^2$$

Rs designating the resistance of the stator, Rr being the resistance of the rotor, Lm designating the mutual inductance, Ls designating the inductance of the stator, and Lr being the inductance of the rotor.

Similarly, the output vector Y has as its components, the rotor flux and the electromagnetic torque, and it is defined in application of above-mentioned equation (2) as follows:

$$Y = \begin{pmatrix} \|\vec{\Phi}_r\|^2 \\ C \end{pmatrix} = \begin{pmatrix} \Phi_{r\alpha}^2 + \Phi_{r\beta}^2 \\ p\frac{Lm}{Lr}(\Phi_{r\alpha}I_{s\beta} - \Phi_{r\beta}I_{s\alpha}) \end{pmatrix}$$

in which p is the number of pairs of poles.

It will be observed that in the above the control voltage $V_{ref}$ can be considered as being constant between two sampling periods. Under such circumstances, the first stage 20 of the regulator 16 can proceed with rendering the above-mentioned state equations discrete on the basis of the following equations:

$$X_{k+1}=[F(\omega)_k]X_k+[G]V_{ref} \quad (3)$$

$$Y_k=h(X_k), \quad (4)$$

with:

$$[F]=e^{[A]T},$$

and $$[G]=[A]^{-1}[e^{[A]T}-I][B]$$

in which:

$X_{k+1}$ designates the discrete state vector at instant (k+1) T;

$X_k$ and $V_{ref}$ designate respectively the state vector of the system and the control voltage at instant kT;

I designates the identity matrix;

[F($\omega_k$)] designates the discrete state matrix;

[G] is tho discrete input matrix; and h is the discrete output function.

It will be observed that above equations (3) and (4) which enable the system to be rendered discrete also take account of the discrete nature of the inverter, insofar as the inverter delivers a constant mean voltage during one sampling period, as mentioned above.

Although the inverter delivers a voltage whose mean value is constant during one sampling period, the chopper frequency of the inverter can naturally be higher than the sampling frequency. Thus, although the voltage delivered by the inverter enables the torque and the flux of the rotary machine 12 to be regulated, it is possible to act on the frequency and the duration of the voltage delivered by the inverter during each sampling period, while nevertheless retaining a mean value that is constant, thus making it possible, for example, to comply with a requirement for harmonic content over the sampling period.

The components of the state vector X are the predicted stator current vector and the predicted rotor flux vector of the machine, expressed in a frame of reference having two dimensions that are fixed relative to the stator, and it is expressed by the following equation;

$$\begin{pmatrix} \vec{I}_{k+1} \\ \vec{\Phi}_{k+1} \end{pmatrix} = \begin{pmatrix} F_{11} F_{12} \\ F_{21} F_{22} \end{pmatrix} \begin{pmatrix} \vec{I}_k \\ \vec{\Phi}_k \end{pmatrix} + \begin{pmatrix} G_1 + G_3 \\ G_2 + G_4 \end{pmatrix} \vec{V}_{ref} \quad (5)$$

or indeed:

$$\vec{I}_{k+1} = [F11]\vec{I}_k + [F12]\vec{\Phi}_k + [G1]\vec{V}_{ref} + [G3]\vec{V}_{ref}$$

$$\vec{\Phi}_{k+1} = [F21]\vec{I}_k + [F22]\vec{\Phi}_k + [G2]\vec{V}_{ref} + [G4]\vec{V}_{ref}$$

with:

$$[G_1] = \begin{bmatrix} a & o \\ o & a \end{bmatrix},$$

$$[G_2] = \begin{bmatrix} b & o \\ o & b \end{bmatrix},$$

$$[G_3] = \begin{bmatrix} o & +c \\ -c & o \end{bmatrix}, \text{ and}$$

$$[G_4] = \begin{bmatrix} o & -d \\ +d & o \end{bmatrix}$$

Thus, the state vector predicted by the first stage 20 of the regulator 16, having components comprising the value of the predicted stator current vector $\vec{I}_{k+1}$ and the value of the predicted rotor flux vector $\vec{\Phi}_{k+1}$ at the instant (k+1)T has a first term that depends solely on the control voltage $V_{ref}$ to be applied to the inverter 14 and a second term that depends solely on the starting instant kT, corresponding to the system varying freely between two sampling instants in the absence of any applied control voltage.

Under such circumstances, the predicted stator current and rotor flux can be expressed in the following form:

$$\vec{I}_{k+1} = \vec{I}^o_{k+1} + [G_1]\vec{V}_{ref} + [G_3]\vec{V}_{ref}; \quad (6)$$

and $$\vec{\Phi}_{k+1} = \vec{\Phi}^o_{k+1} + [G_2]\vec{V}_{ref} + [G_4]\vec{V}_{ref} \quad (7)$$

in which $\vec{I}_{k+1}{}^o$ and $\vec{\Phi}_{k+1}{}^o$ respectively designate the free variation of the stator current and the free variation of the rotor flux starting from instant kT between two sampling periods.

As will readily be understood, the above-described equations make it possible to predict the state of the system at instant (k+1)T, on the basis of the control voltage $V_{ref}$ controlling the inverter 14 and of the state of the system at instant kT, assuming that the speed of the rotary machine is constant, given that this parameter varies slowly.

However, it will be observed that these equations which define the value of the stator current and of the rotor flux at instant (k+1)T do not make it possible directly to servo-control the electromagnetic torque and the rotor flux to the set reference values.

Nevertheless, these relationships enable the first stage 20 to compute the predicted torque value $C_{k+1}$, corresponding to the value of the electromagnetic torque at the following sampling instant, using the following equation:

$$C_{k+1} = K(\vec{\Phi}_{k+1} \wedge \vec{I}_{k+1}) \quad (8)$$

in which K designates a term that depends solely on the parameters of the machine 12.

Similarly, the modulus of the predicted rotor flux satisfies the following equation:

$$\|\vec{\Phi}_{k+1}\|^2 = \langle \vec{\Phi}_{k+1}, \vec{\Phi}_{k+1} \rangle \quad (9)$$

By replacing the predicted magnitudes for current and flux in above equations (8) and (9), the following are obtained:

$$C_{k+1} = C^o_{k+1} + K(\vec{\Psi}^o_{k+1} \wedge \vec{V}_{ref}) - K(ad+bc)\|\vec{V}_{ref}\|^2 \quad (10)$$

with:

$$\vec{\Psi}^o_{k+1} = \begin{bmatrix} a & -c \\ +c & a \end{bmatrix} \vec{\Phi}^o_{k+1} - \begin{bmatrix} b & d \\ -d & b \end{bmatrix} \vec{I}^o_{k+1}$$

and similarly, the modulus of the predicted rotor flux satisfies the following equation:

$$\|\vec{\Phi}_{k+1}\|^2 = \quad (11)$$

$$\|\vec{\Phi}^o_{k+1}\|^2 + 2b\langle \vec{\Phi}^o_{k+1}, \vec{V}_{ref} \rangle - 2d(\vec{\Phi}^o_{k+1} \wedge \vec{V}_{ref}) + (b^2 + d^2)\|\vec{V}_{ref}\|^2$$

It will be understood that on the basis of the model of the system constituted by the rotary machine 12 and the voltage inverter 14 as stored in the first stage 20 of the regulator 16, the regulator is in a position at each sampling instant kT to predict the value of the electromagnetic torque and of the rotor flux of the rotary machine 12 at the following instant (k+1)T.

These predicted values $C_{k+1}$ and $$\|\vec{\Phi}_{k+1}\|^2$$

contain respective first terms $C_{k+1}{}^o$ and $$\|\vec{\Phi}^o_{k+1}\|^2$$

corresponding to the system varying freely from the electromagnetic torque and rotor flux values at instant kT, and in the absence of any control voltage $V_{ref}$, plus respective second terms that depend on the control voltage $V_{ref}$ applied to the input of the voltage inverter 14.

It will be observed that tho free variations $C_{k+1}{}^o$ and $$\|\vec{\Phi}^o_{k+1}\|^2$$

can be determined relatively accurately insofar as the characteristics of the rotary machine 12 and of the inverter 14 are known accurately.

Under such circumstances, in order to servo-control the electromagnetic torque aid the flux on the corresponding reference values, it is appropriate merely to generate a control voltage $V_{ref}$ that enables the operating characteristics of the motor 12 to be modified in such a manner as to cause the electromagnetic torque and the rotor flux to vary from the values corresponding to free variation of the torque and free variation of the flux to the reference values that are to be obtained.

In other words, it is appropriate to determine the control voltage $V_{ref}$ that satisfies above-mentioned equations (10) and (11).

More particularly, it is appropriate to determine the control voltage $V_{ref}$ that satisfies the following equations:

$$\Delta C = (\vec{\Psi}^o_{k+1} \wedge \vec{V}_{ref}) - (ad+bc)\|\vec{V}_{ref}\|^2 \quad (12)$$

$$\Delta \Phi = 2b(\vec{\Phi}^o_{k+1}, \vec{V}_{ref}) - 2d(\vec{\Phi}^o_{k+1} \wedge \vec{V}_{ref}) + (b^2+d^2)\|\vec{V}_{ref}\| \quad (13)$$

with $\Delta C = \frac{1}{K}(C_{k+1} - C^o_{k+1})$ and $$\Delta \Phi = \|\vec{\Phi}_{k+1}\|^2 - \|\vec{\Phi}^o_{k+1}\|^2,$$

or in developed form in the two-dimensional frame of reference α, β:

$$\Delta C = \Psi^o_{(k+1)\alpha} V_\beta - \Psi^o_{(k+1)\beta} V_\alpha - (ad+bc)(V^2_{ref\alpha} + V^2_{ref\beta}) \quad (14)$$

$$\Delta \Phi = 2b[\Phi^o_{(k+1)\alpha} V_{ref\alpha} + \Phi^o_{(k+1)\beta} V_{ref\beta}] - \quad (15)$$
$$2d[\Phi^o_{(k+1)\alpha} V_{ref\beta} - \Phi^o_{(k+1)\beta} V_{ref\alpha}] + (b^2+d^2)(V^2_{ref\alpha} + V^2_{ref\beta})$$

As can be seen in FIG. 1, in order to perform these computations, the second computation stage 22 of the regulator 16 receives from the first stage 20 both the value for free variation of the stator current and the value for free variation of the rotor flux of the machine, together with the components of the input matrix in discrete form $G(\omega_k)$.

As will readily be understood, by writing:

$$\lambda_1 = -(ad+bc)$$

and $$\vec{M}^o_{(k+1)1} = \begin{bmatrix} m_1 \alpha \\ m_1 \beta \end{bmatrix} = \begin{pmatrix} 0 & \frac{1}{2\lambda_1} \\ \frac{-1}{2\lambda_1} & 0 \end{pmatrix} \vec{\Psi}^o_{k+1},$$

the following is obtained:

$$(V_{ref\alpha} - m_{1\alpha})^2 + (V_{ref\beta} - m_{1\beta})^2 = \frac{\Delta C}{\lambda 1} + \|\vec{M}^o_{(k+1)1}\|^2 \quad (16)$$

Similarly, by writing:

$$\lambda_2 = b^2 + d^2, \text{ and}$$

$$\vec{M}^o_{(k+1)2} = \begin{pmatrix} m_2 \alpha \\ m_2 \beta \end{pmatrix} = \begin{pmatrix} -b/\lambda_2 & -d/\lambda_2 \\ d/\lambda_2 & -b/\lambda_2 \end{pmatrix} \vec{\Phi}^o_{k+1},$$

using above-mentioned equation (15), the following is obtained:

$$(V_{ref\alpha} - m_2\alpha)^2 + (V_{ref\beta} - m_2\beta)^2 = \frac{\Delta \Phi}{\lambda_2} + \|\vec{M}^o_{(k+1)2}\|^2. \quad (17)$$

Figure 2:
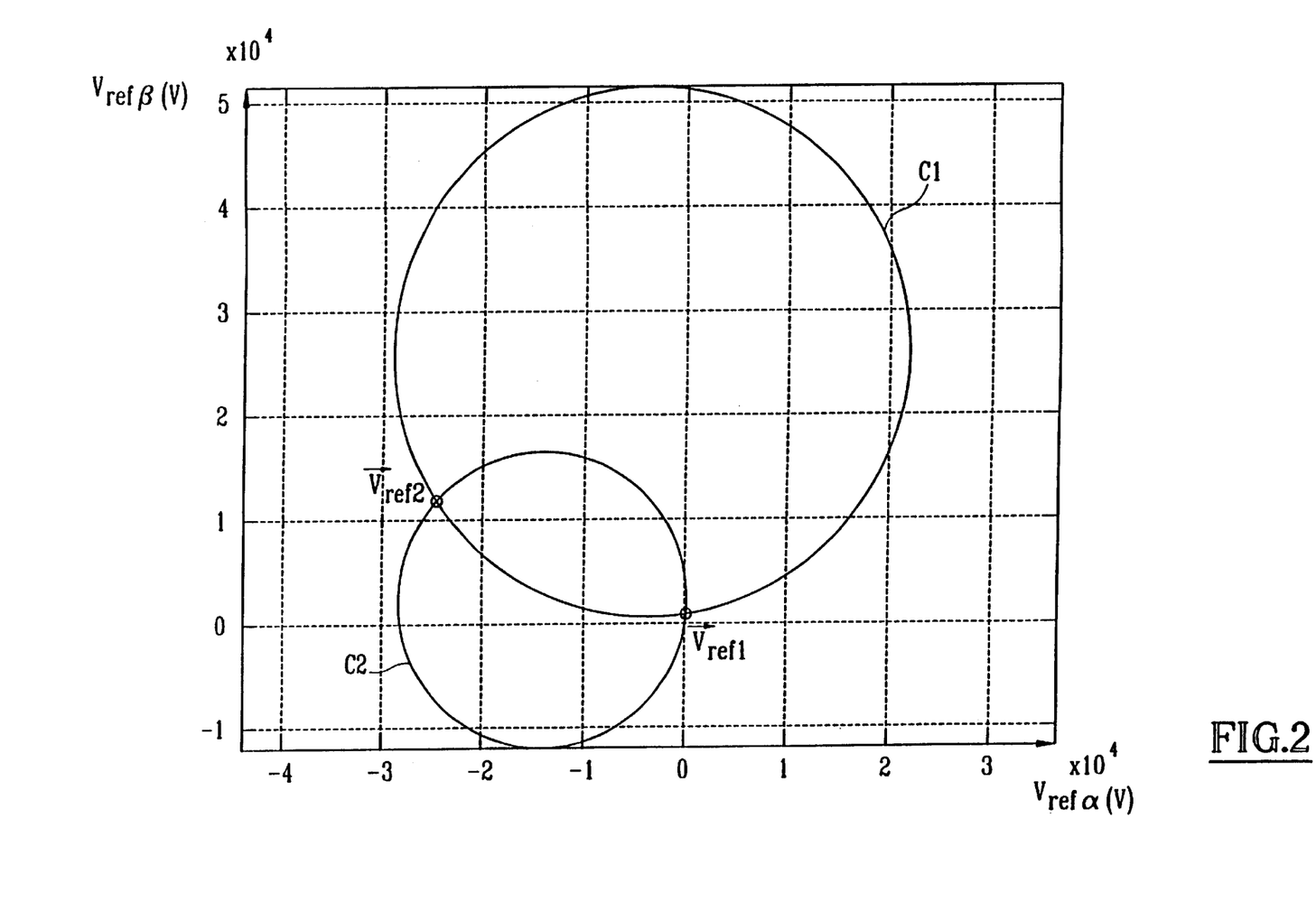
FIG. 2 plots curves showing how the control voltage is determined.

Thus, as can be seen on FIG. 2, the exact discrete control voltage $V_{ref}$, constituting the solution of the system of equations (14) and (15) is constituted by the intersection of two circles corresponding to above-mentioned equations (16) and (17), i.e. a first circle C1 of center $M_1$=

$$M_1 = \begin{pmatrix} m_1 \alpha \\ m_1 \beta \end{pmatrix}$$

and of radius $R_1$=

$$R_1 = \sqrt{\frac{\Delta C}{\lambda_1} + \|\vec{M}^o_{(k+1)1}\|^2},$$

and a circle C2 of center $M_2$=

$$M_2 = \begin{pmatrix} m2\alpha \\ m2\beta \end{pmatrix}$$

and of radius $R_2$=

$$R_1 = \sqrt{\frac{\Delta C}{\lambda_1} + \|\vec{M}^o_{(k+1)1}\|^2}.$$

It will be observed that the centers $M_1$ and $M_2$ of the circles C1 and C2 move along respective free variation trajectories $$\vec{\Psi}^o_{k+1} \text{ and } \vec{\Phi}^o_{k+1}.$$

When the circles C1 and C2 intersect at two distinct points $$\vec{V}_{ref1} \text{ and } \vec{V}_{ref2}$$

the second computation stage 22 selects the reference voltage $$\vec{V}_{ref1}$$

which corresponds to minimizing electrical power.

It will also be observed that the coefficients c and d of the discrete input matrix [G] depend on the angular velocity ω and on the sampling period T to the power 3 or greater. Consequently, at low angular velocity ω, and insofar as the sampling period T is generally small, these coefficients can be ignored. Under such circumstances, above-mentioned equation (14) can be written as follows:

$$\Delta C = \Psi_{(k+1)\alpha}{}^o V_\beta - \Psi_{(k+1)\beta}{}^o V_{60} \quad (18)$$

Thus, under such circumstances, the control voltage $V_{ref}$ to be applied to the input of the inverter 14 is constituted by the intersection of the circle C2 corresponding to above-mentioned equation (17) and a straight line corresponding to equation (18).

In another approximation, the $b^2$ term can be ignored insofar as the coefficient b of the discrete input matrix [G] depends on the sampling period by an order of not less than two.

Thus, conserving the previously made approximation, i.e. c and d equal to zero, equation (15) becomes:

$$\Delta \Phi = 2b[\Phi_{(k+1)\alpha}{}^o V_{ref\alpha} + \Phi_{(k+1)\beta}{}^o V_{ref\beta}] \quad (19)$$

Figure 3:
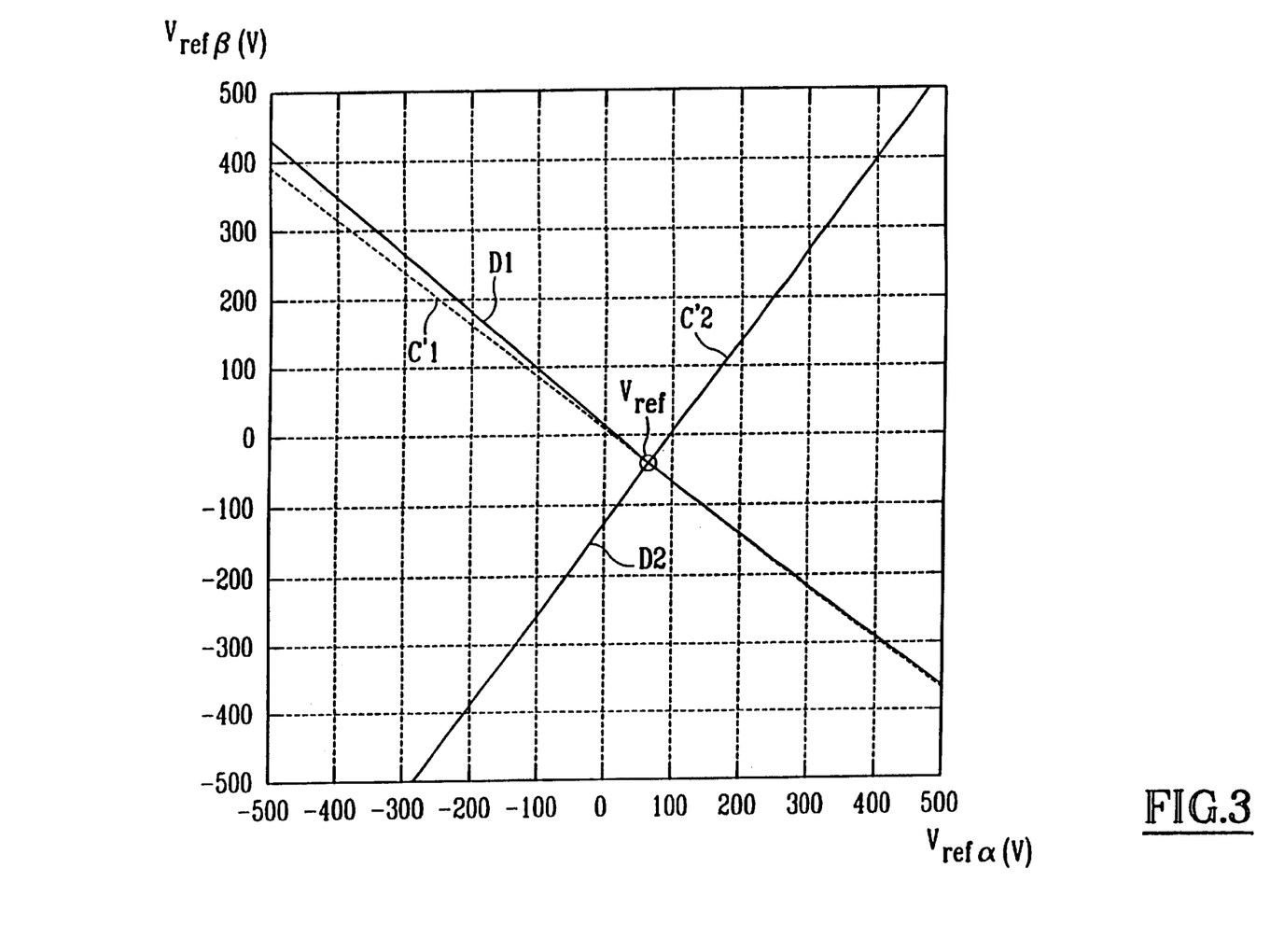
FIG. 3 plots curves enabling the control voltage to be determined by using approximations that are justified at low speed.

In this case, and using these approximation, a can be seen in FIG. 3, the control voltage satisfying above equations (18)

and (19) corresponds to the intersection of two straight lines D1 and D2 giving the control voltage to be applied for applying the desired electromagnetic torque and rotor flux between two sampling periods as a function of components $V_{ref\alpha}$ and $V_{ref\beta}$ of the reference voltage in the frame of reference that is fixed relative to the stator.

In FIG. 3, dashed lines represent the exact solution, i.e. the intersection of the two circles C'1 and C'2, which coincides with D2, as obtained without ignoring the terms $b^2$, c, and d.

It can be seen that the approximations made for calculating the control voltage $V_{ref}$ give rise to hardly any variation in this voltage over the low-speed range.

Another approximation consists in ignoring only the terms (ad+bc) and $(b^2+d^2)$ which depend on the sampling period by an order of not less than 4.

Such an approximation remains valid at higher speeds.

Under such circumstances, equation (15) becomes:

$$\Delta\Phi = 2b[\Phi_{(k+1)\alpha}{}^0 V_{ref\alpha} + \Phi_{(k+1)\beta}{}^0 V_{ref\beta}] - 2d[\Phi_{(k+1)\alpha}{}^0 V_{ref\beta} - \Phi_{(k+1)\beta}{}^0 V_{ref\alpha}] \quad (20)$$

The control voltage satisfying equations (18) and (20) likewise corresponds to the intersection of two straight lines.

It will be understood that the invention as described above using a regulator that has a discrete model of the machine 12 and of the inverter 14 stored in its memory makes it possible by means of appropriate computation algorithms firstly to compute the torque value and the flux value that need to be added to free variation of the torque and the flux between two sampling periods, and secondly to generate the control voltage $V_{ref}$ for controlling the inverter in such a manner as to obtain the set reference values.

In practice, and as can be seen in FIG. 1, the first stage supplies the inverting terminals of comparators 24 and 26 with the respective free variation values which are subtracted from the corresponding reference values, and the second stage responds to the outputs from these comparators to generate the control voltage $V_{ref}$.

What is claimed is:

1. A method of regulating a rotary machine powered by a voltage inverter receiving as an input a discrete control voltage generated by a regulator, wherein the regulator receives as inputs, an electromagnetic torque reference value and at least one sampled signal representative of the electromagnetic torque of the rotary machine, and predicts at each sampling instant an electromagnetic torque value at a following sampling instant to modify the control voltage, the method comprising:

servo-controlling an electromagnetic torque of the rotary machine based on said electromagnetic torque reference value and said sampled signal, said step of servo-controlling the electromagentic torque comprising:

computing a discrete model of a system comprising the machine and the inverter so as to establish a variation of electromagnetic torque between two sampling instants in the form of a first term corresponding to free variation of the system from a state corresponding to the sampling instant and in the absence of a control voltage, and a second term corresponding to variation of the system in response to the control signal; and modifying the control voltage to vary the electromagnetic torque of the machine a value corresponding to free variation of the torque towards the electromagnetic torque reference value.

2. A method according to claim 1, further comprising servo-controlling the magnetic flux of the rotary machine based on a reference flux value received as input to the regulator by modifying the control voltage to vary the magnetic flux from a value corresponding to free variation of the magnetic flux to the reference flux value.

3. A method according to claim 2, wherein in said steps of servo-controlling the electromagnetic torque and the magnetic flux, the control voltage is modified at each sampling instant to obtain the reference torque value and the reference flux value at the following sampling instant.

4. A method according to claim 3, wherein the step of computing the discrete model of the system comprises computing a state vector X and an output vector Y of the machine in accordance with the following equations:

$$X = [A(\omega)]X + [B]V_{ref},$$

and $$Y = h(X)$$

in which:

[A($\omega$)] represents a state matrix of the machine that varies as a function of a speed $\omega$ of the machine;

[B] represents an input matrix of the system;

h represents an output function of the system; and $V_{ref}$ represents the control voltage; and generating characteristics $\Delta C$ and $\Delta\phi$ representative of the torque variation and the flux variation to be obtained between firstly free variation during the sampling period and secondly the following sampling instant, on the basis of the discrete model of the system as defined by the following equations:

$$\Delta C = \left(\vec{\Psi}_{k+1}^0 \wedge \vec{V}_{ref}\right) - (ad + bc)\|\vec{V}_{ref}\|^2 \text{ and}$$

$$\Delta\phi = 2b\left(\vec{\phi}_{k+1}^0, \vec{V}_{ref}\right) 2d\left(\vec{\phi}_{k+1}^0 \wedge \vec{V}_{ref}\right) + (b^2 + d^2)\|\vec{V}_{ref}\|^2,$$

in which:

$$\vec{\psi}_{k+1}^o = \begin{bmatrix} a & -c \\ +c & a \end{bmatrix} \vec{\phi}_{k+1}^o - \begin{bmatrix} b & d \\ -d & b \end{bmatrix} \vec{I}_{k+1}^o$$

where a, b, c, and d represent coefficients of the discrete input matrix of the system, $$\vec{I}_{k+1}^o$$

designates the predicted free variation of the stator current vector during the sampling period, $$\vec{\Phi}_{k+1}^o$$

designates the predicted free variation of the magnetic flux vector of the machine during the sampling period, and $$\|\vec{V}_{ref}\|^2$$

designates the modulus squared of the control voltage; and the regulator being implemented in such a manner as to determine the value of the control voltage to be applied to the input of the inverter so as to obtain the torque variation $\Delta C$ and the flux variation $\Delta\phi$.

5. The method according to claim 4, wherein the control voltage applied to the input of the inverter comprises a voltage corresponding to minimizing electrical power as selected from reference voltages that satisfy the equations defining said characteristics representative of torque variation and flux variation.

6. A power supply circuit for a rotary machine comprising:

a voltage inverter powered by a power supply voltage, a regulator receiving as input an electromagnetic torque reference value and at least one sampled signal representative of an electromagnetic torque of the rotary machine and delivering to the inverter a control voltage for servo-controlling the electromagnetic torque of the rotary machine based on the electromagnetic torque reference value, by predicting at each sampling instant a value of the electromagneic torque at a following sampling instant and modifying the control voltage, the regulator including a memory for storing a discrete model of a system comprising the machine and the inverter in the form of a first term corresponding to free variation of the system in the absence of control voltage and a second term corresponding to variation of the system in response to the control signal, between two sampling instants, and means for generating a control voltage adapted to cause the electromagnetic torque to vary from a value corresponding to free variation of the torque to the reference torque value.

7. A power supply circuit according to claim 6, wherein the regulator receives as input a magnetic flux reference value and a sampled signal representative of the magnetic flux value of the machine, and the regulator flier comprises means for generating a control voltage for causing the magnetic flux of the machine to vary from a value corresponding to free variation of the magnetic flux to the magnetic flux reference value.

8. A power supply circuit according to claim 7, wherein the means for generating the control voltage are adapted to generate the control voltage at each sampling instant in such a manner as to obtain said reference torque and flux values at the following sampling instant.

* * * * *